(12) United States Patent
Matsui et al.

(10) Patent No.: US 10,162,088 B2
(45) Date of Patent: *Dec. 25, 2018

(54) IMAGE DISPLAY APPARATUS

(71) Applicant: Japan Display Inc., Tokyo (JP)

(72) Inventors: Yasuyuki Matsui, Kanagawa (JP); Masaaki Kabe, Kanagawa (JP); Akira Sakaigawa, Kanagawa (JP); Koji Noguchi, Kanagawa (JP); Kenta Seki, Kanagawa (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/653,063

(22) Filed: Jul. 18, 2017

(65) Prior Publication Data

US 2017/0315279 A1  Nov. 2, 2017

Related U.S. Application Data

(63) Continuation of application No. 15/221,646, filed on Jul. 28, 2016, now Pat. No. 9,746,594, which is a
(Continued)

(30) Foreign Application Priority Data

Mar. 26, 2010 (JP) .................................. 2010-072301

(51) Int. Cl.
*G02F 1/1335* (2006.01)
*G02B 5/20* (2006.01)
*G02B 5/00* (2006.01)

(52) U.S. Cl.
CPC ............ *G02B 5/201* (2013.01); *G02B 5/003* (2013.01); *G02F 1/133512* (2013.01); *G02F 1/133514* (2013.01); *G02F 1/1335* (2013.01)

(58) Field of Classification Search
CPC ................................................. G02F 1/133512
See application file for complete search history.

(56) References Cited

U.S. PATENT DOCUMENTS 4,800,375 A   1/1989  Silverstein et al.
5,083,853 A   1/1992  Ueki et al.
(Continued)

FOREIGN PATENT DOCUMENTS

CN   100365483   1/2008
CN   101661204   3/2010
(Continued)

OTHER PUBLICATIONS

Chinese Office Action corresponding to Chinese Serial No. 201510005037.8 dated Oct. 25, 2017.
(Continued)

*Primary Examiner* — Rhonda Peace
(74) *Attorney, Agent, or Firm* — Dentons US LLP

(57) ABSTRACT

An image display apparatus including an image display panel that includes: a first color filter for passing light of a first primary and first auxiliary pixels for displaying the first primary; a second color filter for passing light of a second primary and second auxiliary pixels for displaying the second primary; a third color filter for passing light of a third primary and third auxiliary pixels for displaying the third primary; and fourth auxiliary pixels for displaying a fourth color; the first auxiliary pixels, the second auxiliary pixels, the third auxiliary pixels, and the fourth auxiliary pixels being arranged in a two-dimensional matrix, and a light shielding region disposed at least partly around the peripheral edge of each of the fourth auxiliary pixels.

8 Claims, 15 Drawing Sheets

Related U.S. Application Data continuation of application No. 14/854,196, filed on Sep. 15, 2015, now Pat. No. 9,429,689, which is a continuation of application No. 14/339,808, filed on Jul. 24, 2014, now Pat. No. 9,170,451, which is a continuation of application No. 13/969,035, filed on Aug. 16, 2013, now Pat. No. 8,823,907, which is a continuation of application No. 13/046,174, filed on Mar. 11, 2011, now Pat. No. 8,605,238.

(56) References Cited

U.S. PATENT DOCUMENTS

| | | |
|---|---|---|
| 5,587,818 A | 12/1996 | Lee |
| 5,725,976 A | 3/1998 | Nakano et al. |
| 5,792,579 A | 8/1998 | Phillips |
| 6,077,634 A | 6/2000 | Phillips |
| 6,120,947 A | 9/2000 | Phillips |
| 6,376,133 B1 | 4/2002 | Phillips |
| 7,209,198 B2 | 4/2007 | Park et al. |
| 7,248,314 B2 | 7/2007 | Yun |
| 7,371,486 B2 | 5/2008 | Kobayashi et al. |
| 7,483,095 B2 | 1/2009 | Roth et al. |
| 7,668,404 B2 | 3/2010 | Park et al. |
| 7,697,106 B2 * | 4/2010 | Sawasaki ............ G02F 1/13394 349/106 |
| 7,705,936 B2 | 4/2010 | Lee et al. |
| 7,916,245 B2 | 3/2011 | Taguchi et al. |
| 7,916,246 B2 | 3/2011 | Lee et al. |
| 7,920,114 B2 | 4/2011 | Shiomi |
| 7,995,014 B2 | 8/2011 | Lin et al. |
| 7,995,177 B2 | 8/2011 | Shoraku et al. |
| 8,130,345 B2 | 3/2012 | Woo et al. |
| 8,130,437 B2 | 3/2012 | Hsiao et al. |
| 8,154,568 B2 | 4/2012 | Chou |
| 8,207,924 B2 | 6/2012 | Horiuchi et al. |
| 8,345,197 B2 | 1/2013 | Shoraku et al. |
| 8,384,856 B2 | 2/2013 | Itou et al. |
| 8,400,587 B2 | 3/2013 | Woo et al. |
| 8,605,238 B2 | 12/2013 | Matsui et al. |
| 8,823,907 B2 | 9/2014 | Matsui et al. |
| 9,019,186 B2 | 4/2015 | Sugihara et al. |
| 9,019,455 B2 | 4/2015 | Shoraku et al. |
| 9,170,451 B2 | 10/2015 | Yasuyuki et al. |
| 9,429,689 B2 | 8/2016 | Matsui et al. |
| 9,746,594 B2 * | 8/2017 | Matsui ............ G02F 1/133512 |
| 2001/0019382 A1 | 9/2001 | Song et al. |
| 2004/0135937 A1 | 7/2004 | Lee et al. |
| 2004/0229139 A1 | 11/2004 | Tanaka et al. |
| 2005/0057708 A1 | 3/2005 | Kuo et al. |
| 2005/0117092 A1 | 6/2005 | Park et al. |
| 2006/0012733 A1 * | 1/2006 | Jin ...................... G02F 1/13336 349/73 |
| 2006/0268203 A1 | 11/2006 | Kurahashi et al. |
| 2007/0052887 A1 | 3/2007 | Brown Elliot et al. |
| 2007/0229735 A1 * | 10/2007 | Lee ................... G02F 1/133512 349/106 |
| 2008/0079755 A1 | 4/2008 | Shiomi |
| 2008/0316398 A1 | 12/2008 | Woo et al. |
| 2009/0051638 A1 * | 2/2009 | Horiuchi ............ G09G 3/2003 345/88 |
| 2009/0141221 A1 * | 6/2009 | Taguchi ............ G02F 1/133512 349/109 |
| 2009/0141381 A1 | 6/2009 | Itou et al. |
| 2009/0190074 A1 | 7/2009 | Woo et al. |
| 2009/0225103 A1 | 9/2009 | Shiomi |
| 2010/0291296 A1 | 11/2010 | Chae et al. |
| 2011/0234949 A1 | 9/2011 | Matsui et al. |
| 2012/0147314 A1 | 6/2012 | Yoshizawa et al. |
| 2012/0169975 A1 | 7/2012 | Okumoto et al. |
| 2013/0329172 A1 | 12/2013 | Matsui et al. |
| 2014/0333877 A1 | 11/2014 | Matsui et al. |
| 2016/0003987 A1 | 1/2016 | Matsui et al. |
| 2016/0334554 A1 * | 11/2016 | Matsui .............. G02F 1/133512 |
| 2017/0315279 A1 * | 11/2017 | Matsui ................... G02B 5/201 |

FOREIGN PATENT DOCUMENTS

| | | |
|---|---|---|
| JP | 11-295717 | 10/1999 |
| JP | 3167026 | 3/2001 |
| JP | 2004-004822 | 1/2004 |
| JP | 2005-062760 | 3/2005 |
| JP | 2005-157392 | 6/2005 |
| JP | 2007-114295 | 5/2007 |
| JP | 2008-122834 | 5/2008 |
| JP | 2008-233588 | 10/2008 |
| JP | 2009-193388 | 8/2009 |
| WO | WO 2006/109577 | 10/2006 |
| WO | WO 2007/088656 A1 | 8/2007 |
| WO | WO 2011/024705 | 3/2011 |

OTHER PUBLICATIONS

Japanese Office Action issued in connection with related counterpart Japanese Patent Application No. 2010-072301 dated Feb. 18, 2014.
Japanese Office Action issued in connection with related counterpart Japanese Patent Application No. 2010-072301 dated Aug. 27, 2013.

* cited by examiner

IMAGE DISPLAY APPARATUS

RELATED APPLICATION DATA

This application is a continuation of U.S. patent application Ser. No. 15/221,646 filed Jul. 28, 2016, which is a continuation of U.S. patent application Ser. No. 14/854,196 filed Sep. 15, 2015, now U.S. Pat. No. 9,429,689 issued Aug. 30, 2016, which is a continuation of U.S. patent application Ser. No. 14/339,808 filed Jul. 24, 2014, now U.S. Pat. No. 9,170,451 issued Oct. 27, 2015, which is a continuation of U.S. patent application Ser. No. 13/969,035 filed Aug. 16, 2013 now U.S. Pat. No. 8,823,907 issued Sep. 2, 2014 which is a continuation of U.S. patent application Ser. No. 13/046,174 filed Mar. 11, 2011, now U.S. Pat. No. 8,605,238 issued on Dec. 10, 2013 the entireties of which are incorporated herein by reference to the extent permitted by law. The present application claims the benefit of priority to Japanese Patent Application No. JP 2010-072301 filed on Mar. 26, 2010 in the Japan Patent Office, the entirety of which is incorporated by reference herein to the extent permitted by law.

BACKGROUND OF THE INVENTION

1. Field of the Invention

The present invention relates to an image display apparatus.

2. Description of the Related Art

In recent years, image display apparatus such as color liquid crystal display apparatus or the like, for example, have been demanded to handle increased electric power consumption due to their higher performance capability. In particular, color liquid crystal display apparatus, for example, have backlights that consume more electric power because of their trends for higher definition, wider color reproduction range, and higher luminance. To solve the problem, attention has been drawn to a technology for constructing each display pixel of four auxiliary pixels which include a white display auxiliary pixel for displaying white color, for example, in addition to a red display auxiliary pixel for displaying red color, a green display auxiliary pixel for displaying green color, and a blue display auxiliary pixel for displaying blue color, the white display auxiliary pixel being used to increase luminance. Since the four auxiliary pixel configuration can produce higher luminance with the same electric power consumed as heretofore, if the same luminance is to be achieved as heretofore, then it is possible to reduce the electric power consumed by the backlight, and to increase the quality of displayed images.

Japanese patent No. 3167026, for example, discloses a color image display apparatus including:

means for generating three types of color signals according to an additive three-primary process from an input signal; and means for generating an auxiliary signal by adding the color signals of three hues at identical ratios and supplying four types of display signals which include the auxiliary signal and three types of color signals produced by subtracting the auxiliary signal from the color signals of three hues to a display unit. The three types of color signals drive red, green, and blue display auxiliary pixels, and the auxiliary signal drives white display auxiliary pixels.

There are known in the art image display apparatus which employ a color filter free of a black matrix (hereinafter referred to as "black-matrix-less color filter" for descriptive purposes). Since no black matrix is included, the image display apparatus have a high aperture ratio (high transmittance). The image display apparatus include light shielding areas as an alternative to a black matrix, which are provided by superposing a corresponding color filter layer on adjacent auxiliary pixels.

SUMMARY OF THE INVENTION

If a black-matrix-less color filter is incorporated in the above structure wherein a pixel includes four types of auxiliary pixels, then since no light shielding area is formed around the fourth auxiliary pixel for emitting white light, the problem of a color shift depending on the viewing angle (a phenomenon in which the color of an image is shifted depending on the viewing angle or direction when the viewer observes an image displayed by the color image display apparatus at a viewing angle) or the problem of a color mixture occurs, as illustrated in conceptual fragmentary cross-sectional views shown in FIG. 1C and FIG. 2B of the accompanying drawings. Specifically, when the viewer sees the image displayed by the color image display apparatus obliquely from above, a portion of light that has passed through the fourth auxiliary pixel enters the first auxiliary pixel or the second auxiliary pixel, causing the fourth auxiliary pixel to look tinted. In FIGS. 1B, 1C, 2A, and 2B, areas denoted "BLACK" are areas which look black when the viewer sees the image displayed by the color image display apparatus obliquely from above, and correspond to light shielding regions or light shielding areas.

Furthermore, as illustrated in a conceptual fragmentary cross-sectional view shown in FIG. 3B, another problem is that there are large interconnect reflections around the fourth auxiliary pixel for emitting white light, resulting in an image quality degradation. Specifically, when external light indicated by the arrows "b" is applied to the color image display apparatus and hits interconnects 24, the external light is reflected by the interconnects 24, but is shielded by light shielding areas and will not be emitted out of the color image display apparatus. However, when external light indicated by the arrows "B" is applied to the color image display apparatus and hits interconnects 24, the external light is reflected by the interconnects 24 and will be emitted out of the color image display apparatus because there are no light shielding areas therefor, resulting in an image quality degradation.

Therefore, it is desirable to provide an image display apparatus which is less liable to cause a large reduction in an aperture ratio (high transmittance) and does not tend to suffer a problem such as color shifts, color mixtures, or interconnect reflections depending on the viewing angle.

To achieve the above desire, there is provided in accordance with the present embodiments an image display apparatus including an image display panel including:

a first color filter for passing light of a first primary and first auxiliary pixels for displaying the first primary;

a second color filter for passing light of a second primary and second auxiliary pixels for displaying the second primary;

a third color filter for passing light of a third primary and third auxiliary pixels for displaying the third primary; and fourth auxiliary pixels for displaying a fourth color;

the first auxiliary pixels, the second auxiliary pixels, the third auxiliary pixels, and the fourth auxiliary pixels being arranged in a two-dimensional matrix; and a light shielding region disposed at least partly around the peripheral edge of each of the fourth auxiliary pixels.

The phrase "peripheral edge of each of the fourth auxiliary pixels" covers the boundary region between an auxiliary pixel adjacent to the fourth auxiliary pixel and the fourth auxiliary pixel. The phrase "light shielding region disposed at least partly around the peripheral edge of each of the fourth auxiliary pixels" covers a light shielding region disposed at least partly at the boundary region between an auxiliary pixel adjacent to the fourth auxiliary pixel and the fourth auxiliary pixel. This holds true in the description which follows.

Since a light shielding region disposed at least partly around the peripheral edge of each of the fourth auxiliary pixels, the image display apparatus according to the present embodiments is prevented from suffering problems such as color shifts or color mixtures depending on the viewing angle, and is also prevented from large interconnect reflections around the fourth auxiliary pixels and hence from image quality degradations, etc. The light shielding region is also effective to prevent color shifts or color mixtures due to a misalignment error caused when the image display apparatus is assembled. The image display apparatus is capable of widening a dynamic range of luminance or reducing electric power consumption without impairing image quality.

DETAILED DESCRIPTION OF THE PREFERRED EMBODIMENTS

Figure 1A:
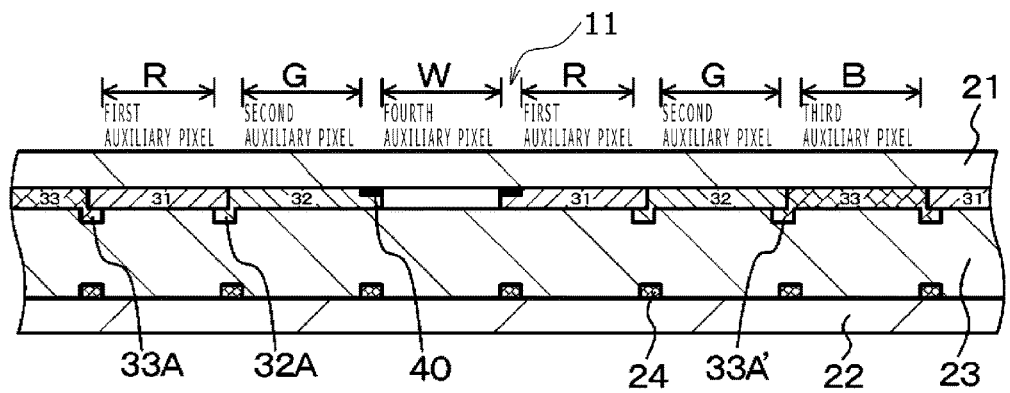
FIG. 1A is a conceptual fragmentary cross-sectional view of an image display apparatus according to Embodiment 1.

The present invention will be described below based on embodiments thereof with reference to the drawings. However, the present invention is not limited to the embodiments, and various numerical values and materials in the embodiments are given by way example only. The description will proceed according to the following order:

1. Image display apparatus according to embodiments of the present invention, description about general matters;
2. Embodiment 1 (image display apparatus according to embodiments of the present invention, image display apparatus according to first mode of the present invention, and first configuration);
3. Embodiment 2 (modification of Embodiment 1, image display apparatus according to first mode of the present invention, and second configuration);
4. Embodiment 3 (modification of Embodiment 1, image display apparatus according to first mode of the present invention, and third configuration);
5. Embodiment 4 (modification of Embodiment 1, image display apparatus according to second mode of the present invention); and
6. Embodiment 5 (modification of Embodiment 1, image display apparatus according to third mode of the present invention), etc.

[Image Display Apparatus According to Embodiments of the Present Invention, Description about General Matters]

In the image display apparatus according to embodiments of the present invention, a light shielding region is disposed fully around the peripheral edge of each of the fourth auxiliary pixels. Alternatively, a light shielding region is disposed partly around the peripheral edge of each of the fourth auxiliary pixels. The image display apparatus thus arranged has a higher aperture ratio (higher transmittance). The light shielding region may be continuous or discontinuous along a side of the peripheral edge of the fourth auxiliary pixel.

In the image display apparatus according to embodiments of the present invention which includes the above various preferred modes, the first auxiliary pixels may display red color, the second auxiliary pixels may display green color, the third auxiliary pixels may display blue color, and the fourth auxiliary pixels may display white color. Such a mode will be referred to as "an image display apparatus according to a first mode of the present invention."

In the image display apparatus according to the first mode of the present invention, each of the first auxiliary pixels may be disposed adjacent to one of the fourth auxiliary pixels, and the light shielding region may be disposed along a side of the peripheral edge of the fourth auxiliary pixel which faces the adjacent first auxiliary pixel. In the image display apparatus according to the first mode of the present invention, each of the second auxiliary pixels may be disposed adjacent to one of the fourth auxiliary pixels, and the light shielding region may be disposed along a side of the peripheral edge of the fourth auxiliary pixel which faces the adjacent second auxiliary pixel.

The side of the peripheral edge of the fourth auxiliary pixel which faces the adjacent auxiliary pixel covers the boundary region between an auxiliary pixel adjacent to the fourth auxiliary pixel and the fourth auxiliary pixel. The phrase "light shielding region disposed on the side of the peripheral edge of the fourth auxiliary pixel which faces the adjacent auxiliary pixel" covers a light shielding region disposed at the boundary region between an auxiliary pixel adjacent to the fourth auxiliary pixel and the fourth auxiliary pixel. This also holds true in the description which follows.

Alternatively, in the image display apparatus according to embodiments of the present invention which includes the above preferred modes, the first auxiliary pixels may display red color, the second auxiliary pixels may display green color, the third auxiliary pixels may display blue color, and the fourth auxiliary pixels may have a fourth color filter for passing light of yellow color and display yellow color. Such a mode will be referred to as "an image display apparatus according to a second mode of the present invention." The fourth auxiliary pixel thus arranged makes it possible to increase the color reproducibility and the transmittance.

In the image display apparatus according to the second mode of the present invention, each of the first auxiliary pixels may be disposed adjacent to one of the fourth auxiliary pixels, each of the second auxiliary pixels may be disposed adjacent to one of the fourth auxiliary pixels, and the light shielding region may be disposed along sides of the fourth auxiliary pixel which face the adjacent first auxiliary pixel and the adjacent second auxiliary pixel. Generally, since yellow color is absorbed by the third color filter, a double-wall structure made up of the third color filter and an extension of the fourth color filter or a double-wall structure made up of an extension of the third color filter and the fourth color filter performs a function as a light shielding region because yellow color is not absorbed by the first color filter or the second color filter.

In the image display apparatus according to embodiments of the present invention which includes the above various modes, the first auxiliary pixels may display red color, the second auxiliary pixels may display green color, the third auxiliary pixels may display blue color, and the fourth auxiliary pixels may have a fourth color filter for passing light of cyan color and display cyan color. Such a mode will be referred to as "an image display apparatus according to a third mode of the present invention." The fourth auxiliary pixel thus arranged makes it possible to increase the color reproducibility.

In the image display apparatus according to the third mode of the present invention, each of the second auxiliary pixels is disposed adjacent to one of the fourth auxiliary pixels, each of the third auxiliary pixels is disposed adjacent to one of the fourth auxiliary pixels, and the light shielding region is disposed along sides of the fourth auxiliary pixel which face the adjacent second auxiliary pixel and the adjacent third auxiliary pixel. Generally, since cyan color is absorbed by the first color filter, a double-wall structure made up of the first color filter and an extension of the fourth color filter or a double-wall structure made up of an extension of the first color filter and the fourth color filter performs a function as a light shielding region because cyan color is not absorbed by the second color filter or the third color filter.

In the image display apparatus according to embodiments of the present invention which includes the above various modes and configurations, the fourth auxiliary pixels are disposed adjacent to each other, and the light shielding region is disposed along a side of the peripheral edge of each of the fourth auxiliary pixels which faces an adjacent one of the fourth auxiliary pixels.

Furthermore, in the image display apparatus according to embodiments of the present invention which includes the above various modes and configurations, the light shielding region is preferably disposed on light exit surfaces of the color filters in view of parallax. However, the light shielding region is not necessarily disposed on light exit surfaces of the color filters, but may be disposed on light entrance surfaces of the color filters.

Moreover, in the image display apparatus according to embodiments of the present invention which includes the above various modes and configurations, the first auxiliary pixels, the second auxiliary pixels, and the third auxiliary pixels may jointly make up first pixels, the first auxiliary pixels, the second auxiliary pixels, and the fourth auxiliary pixels may jointly make up second pixels, the first pixels and the second pixels may jointly make up pixel groups, and the image display panel may include a two-dimensional matrix of the pixel groups arranged in a first direction and a second direction. Such a configuration will be referred to as "an image display apparatus according to a first configuration of the present invention."

Alternatively, the first auxiliary pixels, the second auxiliary pixels, the third auxiliary pixels, and the fourth auxiliary pixels may jointly make up pixels, and the image display panel may include a two-dimensional matrix of the pixels arranged in a first direction and a second direction. Such a configuration will be referred to as "an image display apparatus according to a second configuration of the present invention."

Further alternatively, the first auxiliary pixels, the second auxiliary pixels, and the third auxiliary pixels may jointly make up first pixels, the first auxiliary pixels, the second auxiliary pixels, and the third auxiliary pixels may jointly make up second pixels, the first pixels, the second pixels, and the fourth auxiliary which are disposed between the first pixels and the second pixels may jointly make up pixel groups, and the image display panel may include a two-dimensional matrix of the pixel groups arranged in a first direction and a second direction. Such a configuration will be referred to as "an image display apparatus according to a third configuration of the present invention."

The fourth auxiliary pixels are not limited to one type of pixels, but may be a combination of auxiliary pixels for displaying white color and auxiliary pixels for displaying yellow color, or a combination of auxiliary pixels for displaying white color and auxiliary pixels for displaying cyan color.

The light shielding region may be formed of a known material prepared by adding a pigment, a dye, or a colorant to a resin such as a polyimide resin, an acrylic resin, a photosensitive polyimide resin, a photosensitive acrylic resin, or the like, for example, according to a known process such as a lithographic technology, a printing process, or the like. Alternatively, the light shielding region may be formed according to a combination of a physical vapor-phase growth process or a chemical vapor-phase growth process and a patterning technology. Specifically, the light shielding region may be formed of a metal material (Cr, Ni, Mo, Al, Ta, or the like or an alloy thereof or the like) according to a combination of a sputtering process, an evaporation process, or the like and a patterning technology. The size and shape of the light shielding region may be determined based on the specifications demanded for the image display apparatus. For example, the size and shape of the light shielding region may be selected not to undesirably block light emitted from the light-emitting region of the image display apparatus. Specifically, the light shielding region may be of a width which is about the same as the width of interconnects to be described later.

The image display apparatus itself may be of a known configuration and structure.

The auxiliary pixels may be arranged in a pattern similar to a delta pattern (triangle pattern), a pattern similar to a striped pattern, a pattern similar to a diagonal pattern (mosaic pattern), or a pattern similar to a rectangular pattern. Generally, a pattern similar to a striped pattern is suitable for displaying data and a string of letters on a personal computer or the like. A pattern similar to a mosaic pattern is suitable for displaying natural pictures on video camera recorders, digital still cameras, or the like.

The image display apparatus may be a direct-view-type or a projection-type color image display apparatus or a field-sequential color image display apparatus (direct-view-type or projection-type). The number of pixels that make up the image display apparatus may be determined based on the specifications demanded for the image display apparatus. The image display apparatus may further include a light valve based on the specifications demanded for the image display apparatus.

The image display apparatus is not limited to a color liquid crystal display apparatus, but may be an organic electroluminescence display apparatus (organic EL display apparatus), an inorganic electroluminescence display apparatus (inorganic EL display apparatus), a cold-cathode field emission display apparatus (FED), a surface-conduction electron-emitter display apparatus (SED), a plasma display apparatus (PDP), a cathode-ray tube (CRT), or the like. The color liquid crystal display apparatus is not limited to a transmissive liquid crystal display apparatus, but may be a reflective liquid crystal display apparatus or a semi-transmissive liquid crystal display apparatus.

Embodiment 1

Embodiment 1 is concerned with an image display apparatus according to embodiments of the present invention, and more specifically with an image display apparatus according to a first mode of the present invention and an image display apparatus according to a first configuration of the present invention. In the embodiments described below, a first auxiliary pixel R displays red color, a second auxiliary pixel G displays green color, and a third auxiliary pixel B displays blue color.

FIG. 1A is a conceptual fragmentary cross-sectional view of an image display apparatus 10 according to Embodiment 1, and a layout of pixels in an image display panel 11 is schematically shown in FIG. 4, 5, 6, 7, or 8. The image display apparatus 10 according to Embodiment 1 or each of image display apparatus 10 according to Embodiments 2 through 5 specifically includes a transmissive liquid crystal display apparatus for displaying colors, and includes an image display panel 11 including:

a first color filter 31 for passing light of a first primary (red color) and first auxiliary pixels R for displaying the first primary;

a second color filter 32 for passing light of a second primary (green) and second auxiliary pixels G for displaying the second primary;

a third color filter 33 for passing light of a third primary (blue) and third auxiliary pixels B for displaying the third primary; and fourth auxiliary pixels for displaying a fourth color;

the first auxiliary pixels R, the second auxiliary pixels G, the third auxiliary pixels B, and the fourth auxiliary pixels being arranged in a two-dimensional matrix. The image display panel 11 includes a light shielding region 40 disposed at least partly around the peripheral edge of each of the fourth auxiliary pixels. The light shielding regions 40 are disposed on the light exit surfaces of the color filters.

The transmissive liquid crystal display apparatus includes, for example, a front panel having transparent first electrodes, a rear panel having transparent second electrodes, and a liquid crystal material 23 disposed between the front panel and the rear panel.

The front panel specifically includes, for example, a first substrate 21 in the form of a glass substrate or a silicon substrate, transparent first electrodes (also called common electrodes and made of ITO (Indium Tin Oxide), for example) disposed on an inner surface of the first substrate 21, and a polarizer film disposed on an outer surface of the first substrate 21. In the transmissive color liquid crystal display apparatus, the color filters which are covered with an overcoat layer made of acrylic resin or epoxy resin are disposed on the inner surface of the first substrate 21. The front panel has the transparent first electrodes disposed on the overcoat layer. An orientation film is disposed on the transparent first electrodes. The rear panel specifically includes, for example, a second substrate 22 in the form of a glass substrate or a silicon substrate, switching devices disposed on an inner surface of the second substrate 22, transparent second electrodes (also called pixel electrodes and made of ITO, for example) which are rendered conductive and nonconductive by the switching devices, and polarizer film disposed on an outer surface of the second substrate 22. An orientation film is disposed entirely on the surface which includes the transparent second electrodes. The various components and the liquid crystal material 23 of the liquid crystal display apparatus which may include the transmissive color liquid crystal display apparatus may include known components and material. The switching devices may include, for example, three-terminal devices such as MOS (Metal Oxide Semiconductor) FETs (Field Effect Transistors) and thin-film transistors (TFTs) disposed on a single-crystalline silicon semiconductor substrate, or two-terminal devices such as MIM (Metal Insulator Metal) devices, varistor devices, diodes, or the like. Interconnects 24 for driving the switching devices are disposed on the inner surface of the second substrate 22. As described above, the first color filter for passing light of the first primary, the second color filter for passing light of the second primary, and the third color filter for passing light of the third primary are disposed on the first substrate 21. In the drawings, only the first substrate 21, the second substrate 22, the liquid crystal material 23, and the interconnects 24 are illustrated, and the other components are omitted from illustration.

When the numbers $P_0 \times Q_0$ of pixels ($P_0$ pixels in a horizontal direction and $Q_0$ pixels in a vertical direction) arranged in the two-dimensional matrix or pixels making up a pixel group to be described later are denoted by ($P_0$, $Q_0$), the values of ($P_0$, $Q_0$) may be represented by some image display resolutions including VGA (640, 480), S-VGA (800, 600), XGA (1024, 768), APRC (1152, 900), S-XGA (1280, 1024), U-XGA (1600, 1200), HD-TV (1920, 1080), Q-XGA (2048, 1536), (1920, 1035), (720, 480), and (1280, 960), etc. However, the values of ($P_0$, $Q_0$) are not limited to the above image display resolutions.

Figure 15:
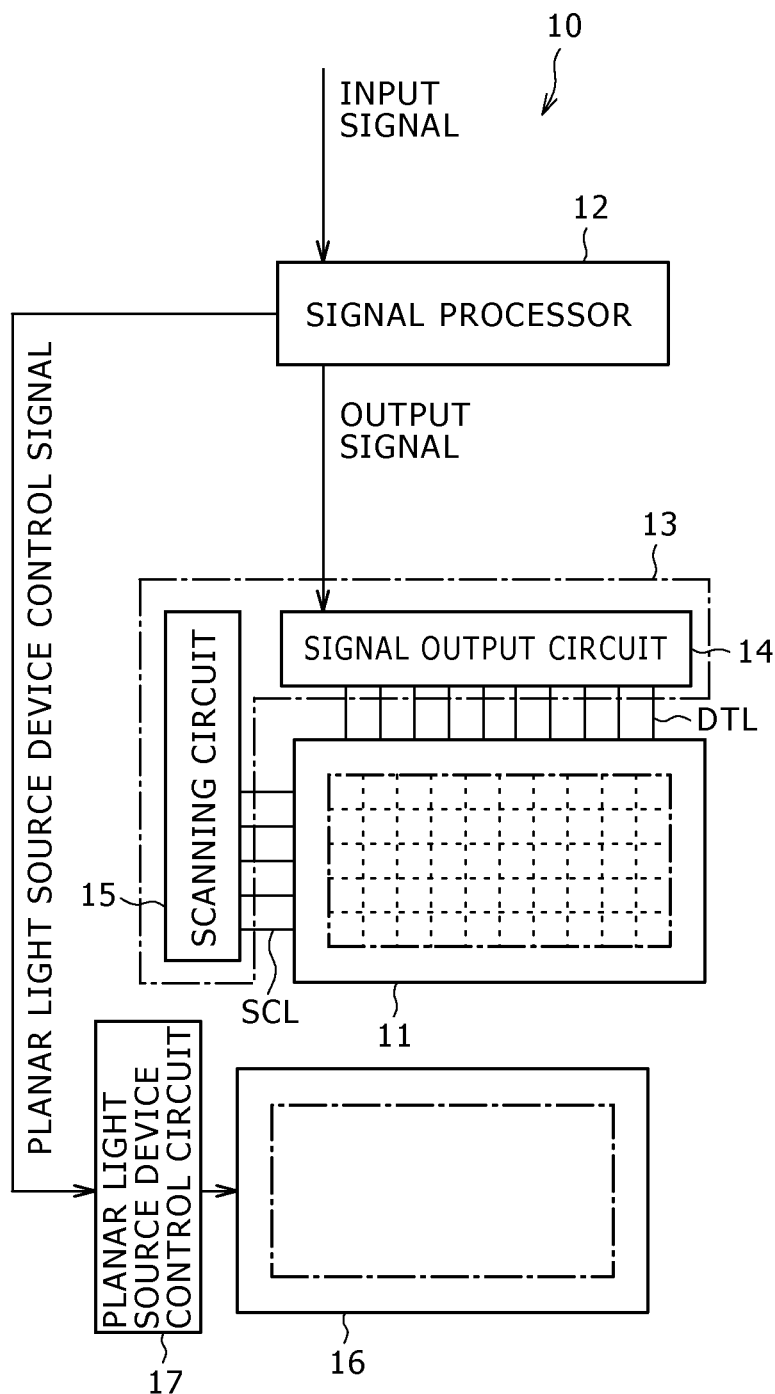
FIG. 15 is a conceptual diagram of the image display apparatus according to Embodiment 1.

As illustrated in a conceptual diagram shown in FIG. 15, the image display apparatus 10 according to Embodiment 1 includes the image display panel 11 and a signal processor 12. An image display apparatus assembly according to Embodiment 1 includes the image display apparatus 10 and a planar light source device 16 for illuminating the rear surface of the image display apparatus (specifically, the image display panel 11).

According to Embodiment 1, signal processor 12 includes an image display panel driving circuit 13 for driving the image display panel (more specifically, a color liquid crystal display panel) 11 and a planar light source device control circuit 17 for driving the planar light source device 16. The image display panel driving circuit 13 includes a signal output circuit 14 and a scanning circuit 15. The scanning circuit 15 turns on and off the switching devices (e.g., TFTs) for controlling operation (light transmittance) of the auxiliary pixels of the image display panel 11. The signal output circuit 14 holds video signals and successively outputs the video signals to the image display panel 11. The signal output circuit 14 and the image display panel 11 are electrically connected to each other by interconnects DTL (interconnects 24), and the scanning circuit 15 and the image display panel 11 are electrically connected to each other by interconnects SCL (interconnects 24). The above structure may be similarly incorporated in various embodiments to be described below. The first auxiliary pixels, the second auxiliary pixels, the third auxiliary pixels, and the fourth auxiliary pixels may be driven by a known driving process.

The planar light source device may be either one of two planar light source devices (backlights), i.e., a direct-lit planar light source device disclosed in Japanese Utility Model Laid-Open No. Sho 63-187120 and Japanese Patent Laid-Open No. 2002-277870, for example, and an edge-lit (also called side-lit) planar light source device disclosed in Japanese Patent Laid-Open No. 2002-131552, for example. The planar light source device includes light sources which may include light-emitting devices, or specifically, light-emitting diodes (LEDs). Since a light-emitting device including a light-emitting diode takes up a small volume, it is preferable when a plurality of such light-emitting devices are to be incorporated. A light-emitting diode as a light-emitting device may be a white light-emitting diode (e.g., a light-emitting diode for emitting white light which includes a combination of a ultraviolet or blue light-emitting diode and a light-emitting particle). Alternatively, a light-emitting device may be a combination of a red light-emitting device (e.g., a light-emitting diode) for emitting red light (having a main wavelength of 640 nm, for example), a green light-emitting device (e.g., a GaN light-emitting diode) for emitting green light (having a main wavelength of 530 nm, for example), and a blue light-emitting device (e.g., a GaN light-emitting diode) for emitting blue light (having a main wavelength of 450 nm, for example). The light-emitting device may further include light-emitting devices for emitting fourth, fifth, . . . color light other than red, green, and blue light. Further alternatively, the light source of the planar light source device may include a cold-cathode fluorescent lamp (CCFL), a hot-cathode fluorescent lamp (HCFL), or an external electrode fluorescent lamp (EEFL).

The planar light source device may be driven by any drive processes under any drive conditions. The light sources may be controlled en bloc. For example, the light-emitting devices may be driven simultaneously. Alternatively, the light-emitting devices may be driven in partial groups or divided groups. Specifically, if the planar light source device includes a plurality of planar light source units, then the image display panel is divided into S×T hypothetical display region units, and S×T planar light source units which correspond respectively to the S×T hypothetical display region units make up the planar light source device. The S×T planar light source units are individually controlled for light emission.

The values of ($P_0$, $Q_0$) and the values of (S, T) are illustrated by way of example in Table 1 below. One display region unit may include 20×20 through 320×240 pixels, or preferably 50×50 through 200×200 pixels. The numbers of pixels of the display region units may be equal to each other or different from each other.

TABLE 1

|  | Values of S | Values of T |
|---|---|---|
| VGA (640, 480) | 2-32 | 2-24 |
| S-VGA (800, 600) | 3-40 | 2-30 |
| XGA (1024, 768) | 4-50 | 3-39 |
| APRC (1152, 900) | 4-58 | 3-45 |
| S-XGA (1280, 1024) | 4-64 | 4-51 |
| U-XGA (1600, 1200) | 6-80 | 4-60 |
| HD-TV (1920, 1080) | 6-86 | 4-54 |
| Q-XGA (2048, 1536) | 7-102 | 5-77 |
| (1920, 1035) | 7-64 | 4-52 |
| (720, 480) | 3-34 | 2-24 |
| (1280, 960) | 4-64 | 3-48 |

In Embodiments 1 through 3, it is assumed that the fourth auxiliary pixels W display white color. The fourth auxiliary pixels W are not combined with a color filter. Rather, the fourth auxiliary pixels W may be combined with a transparent resin layer instead of a color filter for thereby preventing themselves from having large steps which would otherwise be caused by a color filter. The above structure may be similarly incorporated in Embodiments 2 and 3.

According to Embodiment 1, the light shielding region 40 is disposed fully around the peripheral edge of each of the fourth auxiliary pixels W. Specifically, the light shielding region 40 extends continuously fully around the peripheral edge of each of the fourth auxiliary pixels W. Alternatively, the light shielding region 40 may be disposed partly around the peripheral edge of each of the fourth auxiliary pixels W. The light shielding region 40 thus disposed is continuous along a side of the peripheral edge of each of the fourth auxiliary pixels W.

As shown in FIG. 4, 5, 6, 7, or 8, in the image display apparatus 10 according to Embodiment 1, the first auxiliary pixel R, the second auxiliary pixel G, and the third auxiliary pixel B jointly make up a first pixel $Px_1$;

the first auxiliary pixel R, the second auxiliary pixel G, and the fourth auxiliary pixel W jointly make up a second pixel $Px_2$;

the first pixel $Px_1$ and the second pixel $Px_2$ jointly make up a pixel group; and the image display panel 11 includes a two-dimensional matrix of pixel groups arranged in a first direction and a second direction. In FIG. 4, 5, 6, 7, or 8, the first pixel $Px_1$ is encircled by the solid line, and the second pixel $Px_2$ is encircled by the dotted line.

The third auxiliary pixel B has been described as an auxiliary pixel which displays blue color. This is because the luminosity efficiency for blue is about ⅙ of the luminosity efficiency for green, and no problem will be caused if the number of auxiliary pixels for displaying blue color is reduced to one-half in the pixel groups.

Figure 4:
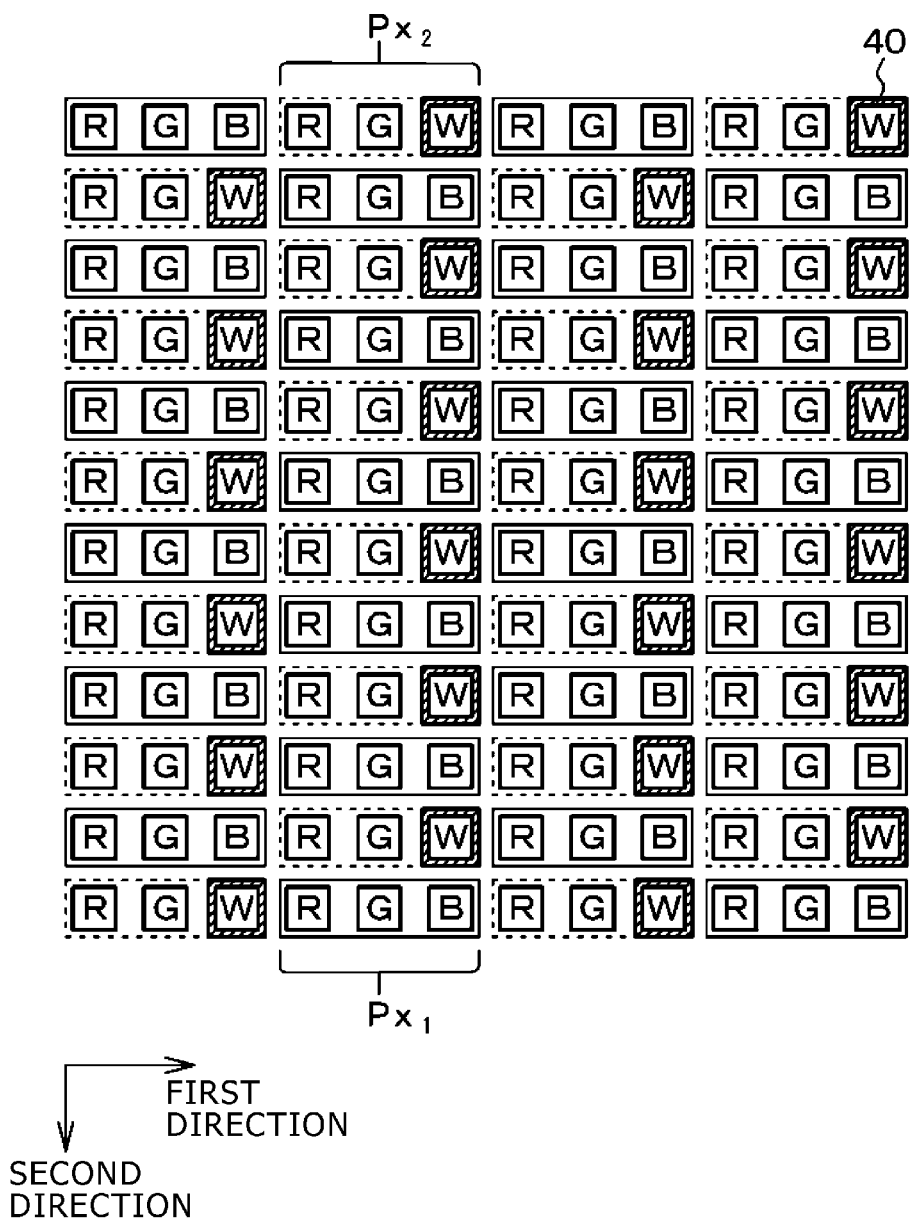
FIG. 4 is a schematic view of layout of pixels and a layout of a pixel group in an image display panel which serves as the image display apparatus according to Embodiment 1.
Figure 5:
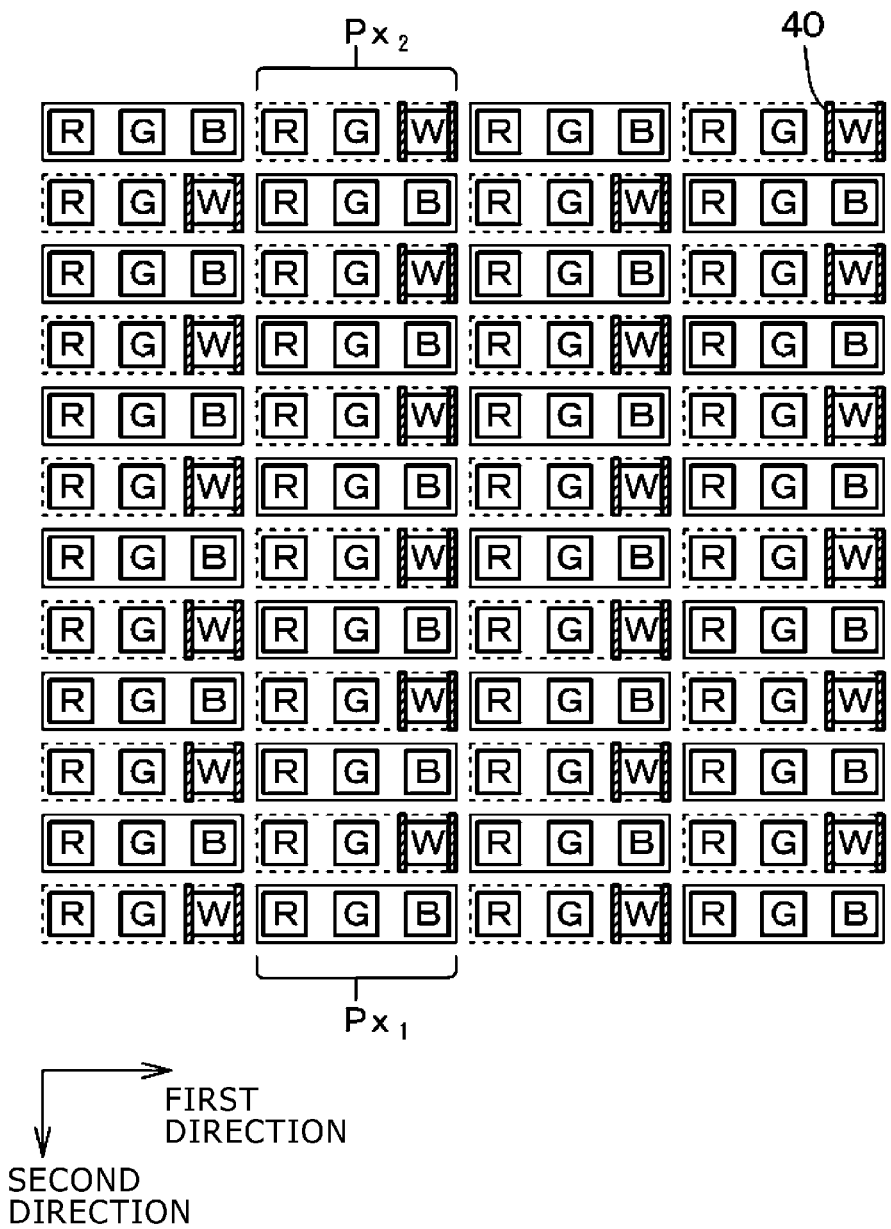
FIG. 5 is a schematic view of layout of pixels and a layout of a pixel group in an image display panel which serves as a modification (1) of the image display apparatus according to Embodiment 1.
Figure 6:
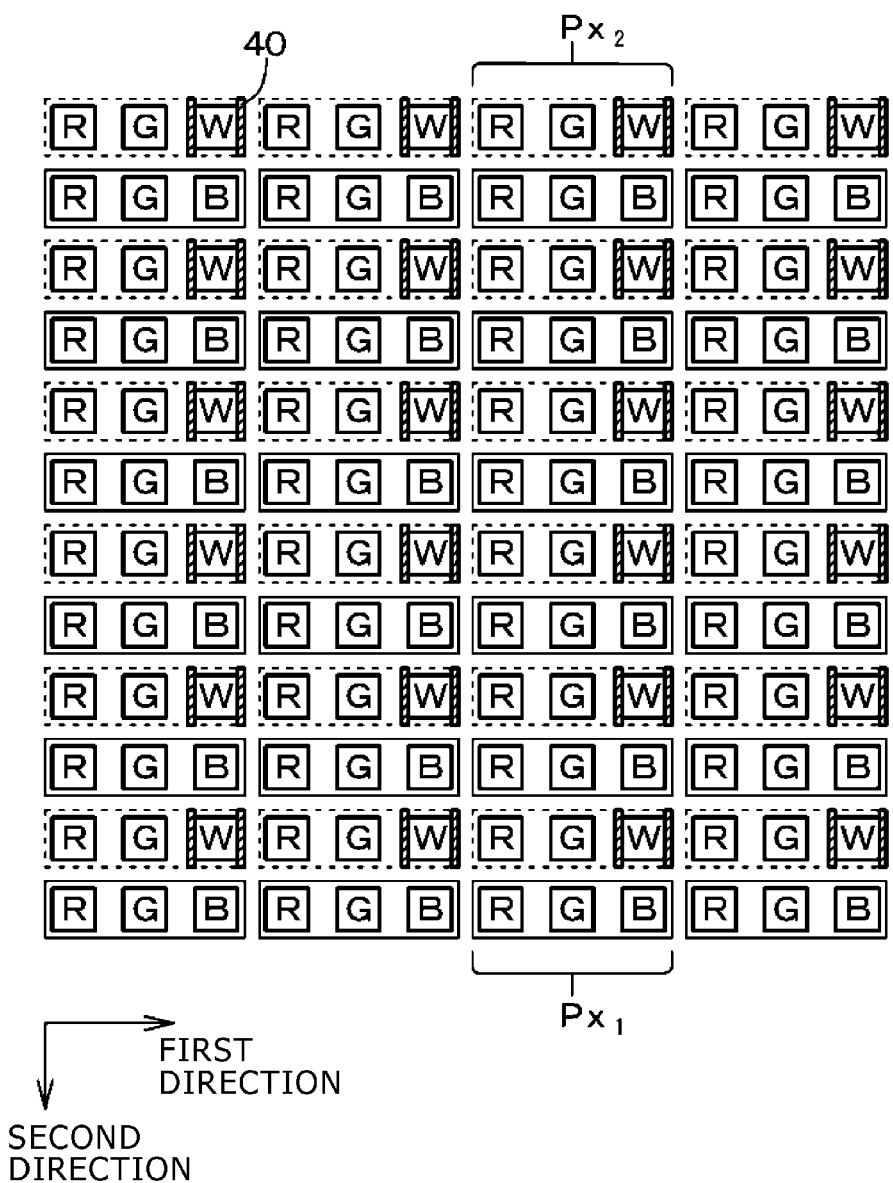
FIG. 6 is a schematic view of layout of pixels and a layout of a pixel group in an image display panel which serves as a modification (2) of the image display apparatus according to Embodiment 1.

As shown in FIG. 4, 5, or 6, the first pixel $Px_1$ and the second pixel $Px_2$ are disposed adjacent to each other along the second direction, and the fourth auxiliary pixel W and the third auxiliary pixel B are disposed adjacent to each other along the second direction. Alternatively, as shown in FIG. 7 or 8, the first pixel $Px_1$ and the second pixel $Px_2$ are disposed adjacent to each other along the first direction, the second pixel $Px_2$ and the second pixel $Px_2$ are disposed adjacent to each other along the second direction, and the fourth auxiliary pixel W and the fourth auxiliary pixel W are disposed adjacent to each other along the second direction.

Figure 7:
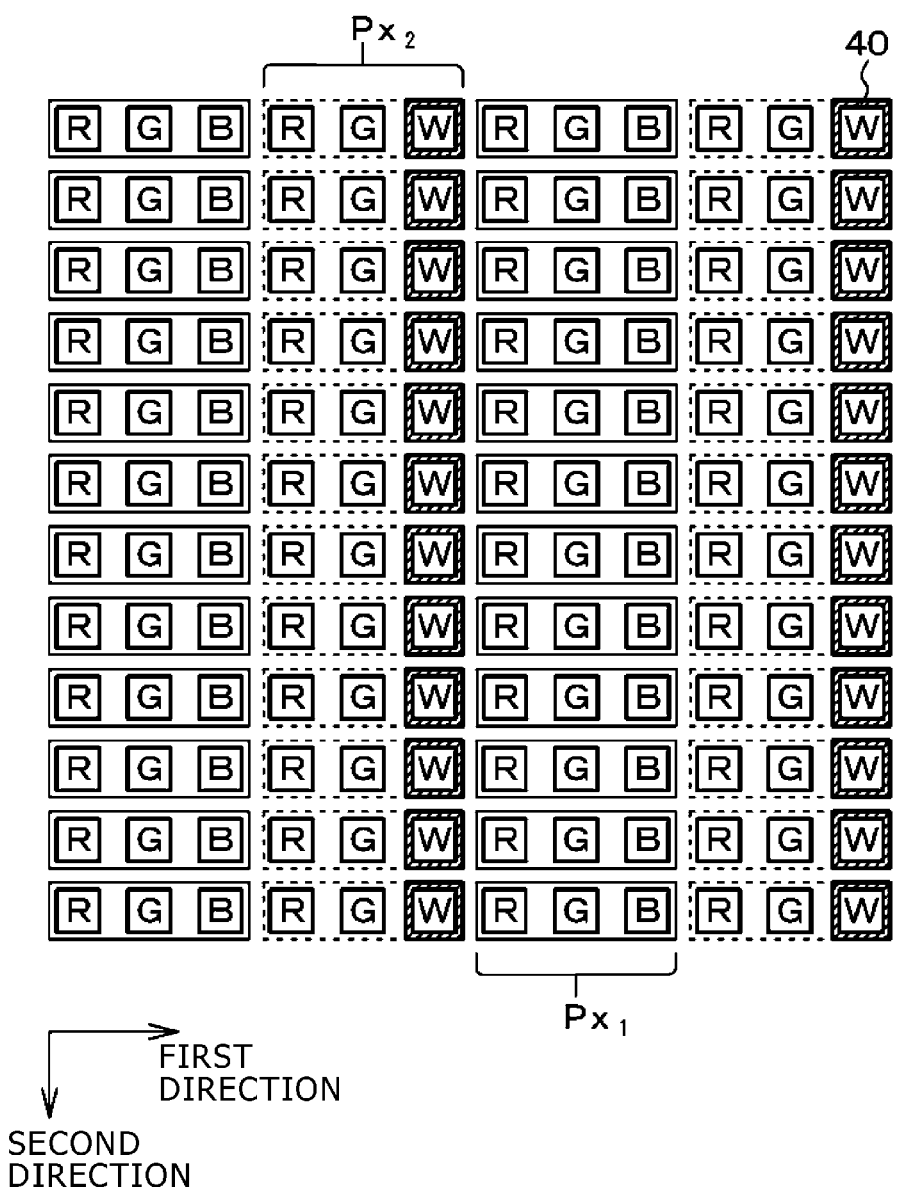
FIG. 7 is a schematic view of layout of pixels and a layout of a pixel group in an image display panel which serves as a modification (3) of the image display apparatus according to Embodiment 1.

In the examples shown in FIGS. 4 and 7, the light shielding regions 40 are disposed fully around the peripheral edges of the fourth auxiliary pixel W.

Figure 8:
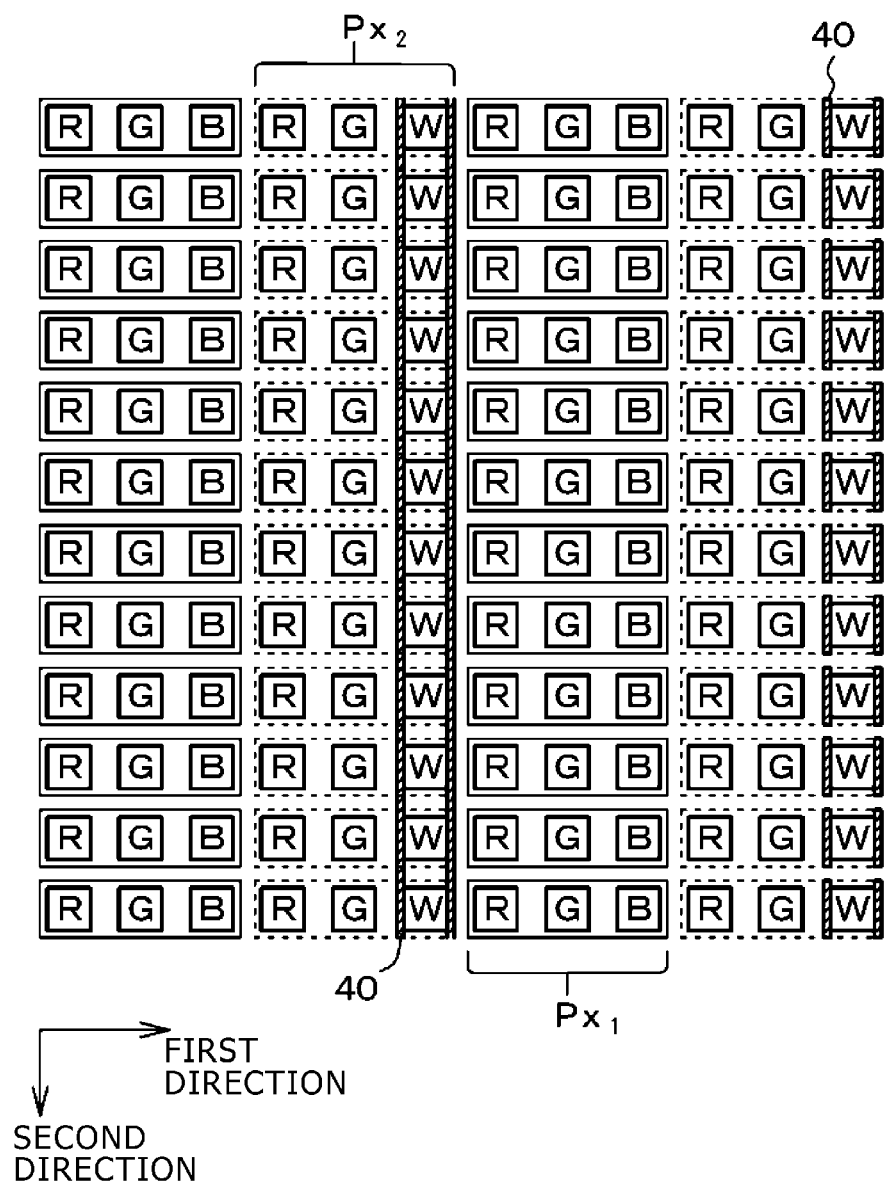
FIG. 8 is a schematic view of layout of pixels and a layout of a pixel group in an image display panel which serves as a modification (4) of the image display apparatus according to Embodiment 1.

In the examples shown in FIGS. 5, 6, and 8, the light shielding region 40 is disposed partly around the peripheral edge of each of the fourth auxiliary pixels W. Specifically, the first auxiliary pixel R and the fourth auxiliary pixel W are disposed adjacent to each other, and the light shielding region 40 is disposed along a side of the peripheral edge of the fourth auxiliary pixel W which faces the adjacent first auxiliary pixel R. In addition, the second auxiliary pixel G and the fourth auxiliary pixel W are disposed adjacent to each other, and the light shielding region 40 is disposed along a side of the peripheral edge of the fourth auxiliary pixel W which faces the adjacent second auxiliary pixel G. In the example shown in FIG. 8, no light shielding region 40 is disposed along sides of the peripheral edge of the fourth auxiliary pixel W which face the adjacent fourth auxiliary pixels W, i.e., sides of the peripheral edge of the fourth auxiliary pixel W which extend along the first direction, and the light shielding regions 40 extend continuously along the adjacent fourth auxiliary pixels W along the second direction.

The first auxiliary pixel R of the first pixel $Px_1$ and the first auxiliary pixel R of the second pixel $Px_2$ may be or may not be disposed adjacent to each other along the second direction. Similarly, the second auxiliary pixel G of the first pixel $Px_1$ and the second auxiliary pixel G of the second pixel $Px_2$ may be or may not be disposed adjacent to each other along the second direction.

No light shielding region 40 is disposed in the boundary region between the first auxiliary pixel R and the second auxiliary pixel G, the boundary region between the first auxiliary pixel R and the third auxiliary pixel B, and the boundary region between the second auxiliary pixel G and the third auxiliary pixel B. The second color filter 32 has an extension 32A extending into the boundary region between the first auxiliary pixel R and the second auxiliary pixel G, and the extension 32A of the second color filter 32 and the first color filter 31 make up a double-walled structure in that boundary region. The third color filter 33 has an extension 33A extending into the boundary region between the first auxiliary pixel R and the third auxiliary pixel B, and the extension 33A of the third color filter 33 and the first color filter 31 make up a double-walled structure in that boundary region. The third color filter 33 has an extension 33A' extending into the boundary region between the second auxiliary pixel G and the third auxiliary pixel B, and the extension 33A' of the third color filter 33 and the second color filter 32 make up a double-walled structure in that boundary region. These double-walled structures can perform a function as light shielding areas. The extensions of the color filters which provide the double-walled structures are illustrated by way of example only, and may be changed appropriately.

Figure 1B:
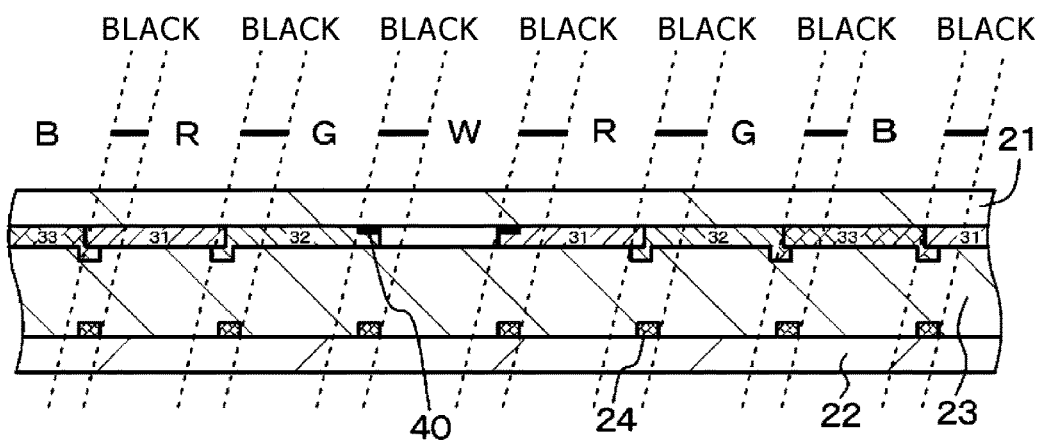
FIG. 1B is a conceptual fragmentary cross-sectional view of the image display apparatus according to Embodiment 1, which illustrates the presence and absence of a color shift or a color mixture depending on the viewing angle.
Figure 1C:
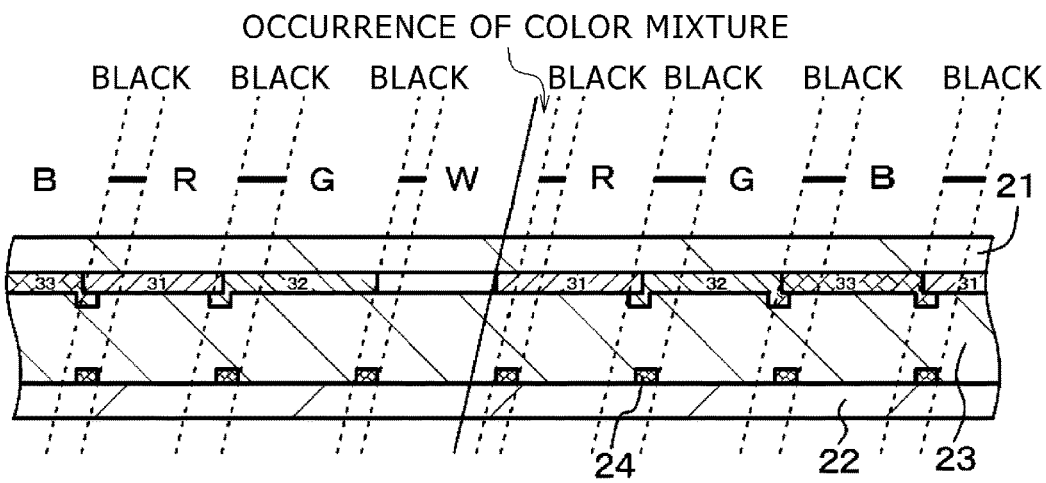
FIG. 1C is a conceptual fragmentary cross-sectional view of an image display apparatus employing an existing black-matrix-less color filter, which illustrates the presence and absence of a color shift or a color mixture depending on the viewing angle.
Figure 2A:
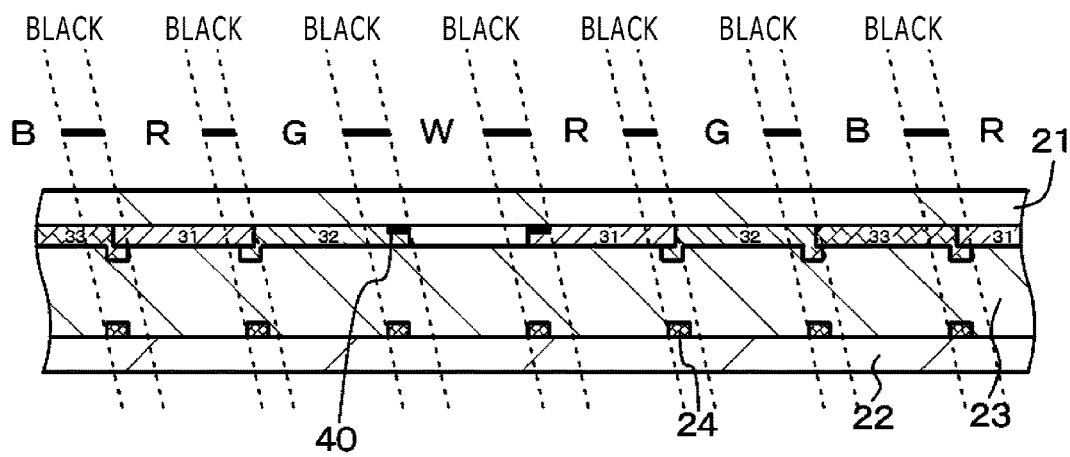
FIG. 2A is a conceptual fragmentary cross-sectional view of the image display apparatus according to Embodiment 1, which illustrates the presence and absence of a color shift or a color mixture depending on the viewing angle.
Figure 2B:
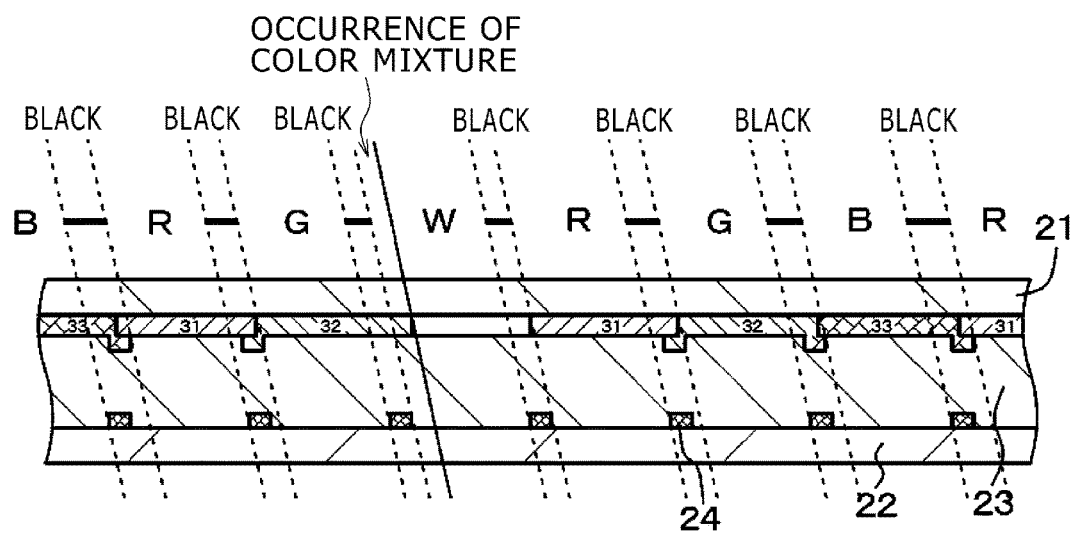
FIG. 2B is a conceptual fragmentary cross-sectional view of an image display apparatus employing an existing black-matrix-less color filter, which illustrates the presence and absence of a color shift or a color mixture depending on the viewing angle.
Figure 3A:
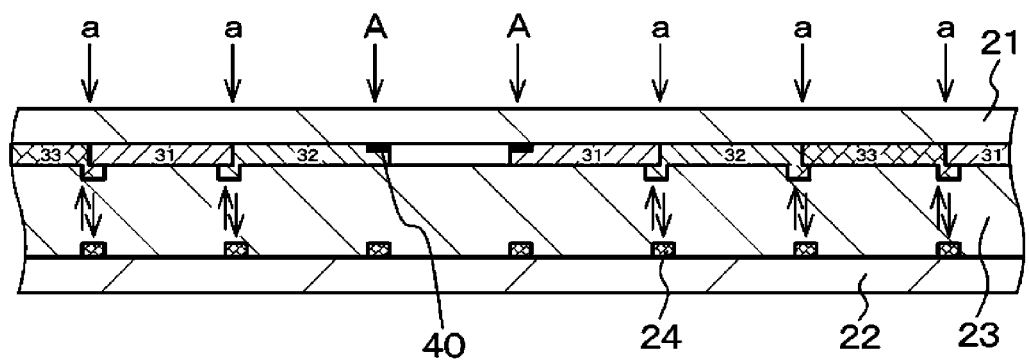
FIG. 3A is a conceptual fragmentary cross-sectional view of the image display apparatus according to Embodiment 1, which illustrates the presence and absence of interconnect reflections.
Figure 3B:
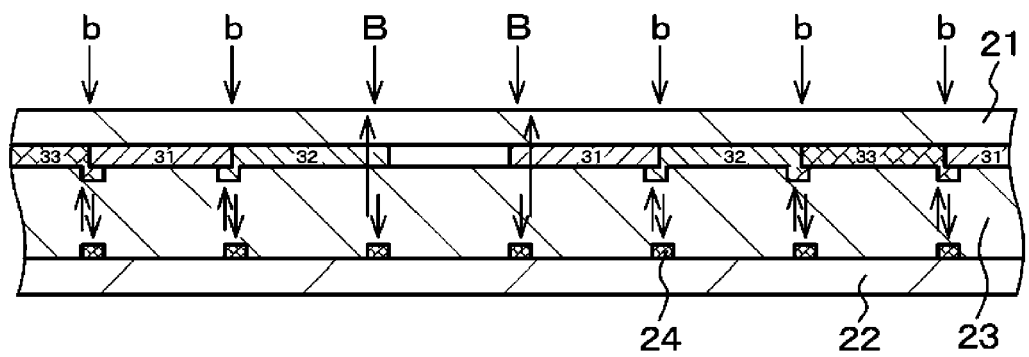
FIG. 3B is a conceptual fragmentary cross-sectional view of an image display apparatus employing an existing black-matrix-less color filter, which illustrates the presence and absence of interconnect reflections.

FIGS. 1B and 2A are conceptual fragmentary cross-sectional views of the image display apparatus 10 according to Embodiment 1, which illustrate the presence and absence of a color shift or a color mixture depending on the viewing angle, and FIGS. 1C and 2B are conceptual fragmentary cross-sectional views of an image display apparatus employing an existing black-matrix-less color filter, which illustrate the presence and absence of a color shift or a color mixture depending on the viewing angle. FIG. 3A is a conceptual fragmentary cross-sectional view of the image display apparatus according to Embodiment 1, which illustrates the presence and absence of interconnect reflections, and FIG. 3B is a conceptual fragmentary cross-sectional view of an image display apparatus employing an existing black-matrix-less color filter, which illustrates the presence and absence of interconnect reflections.

As shown in FIGS. 1B and 2A and FIGS. 1C and 2B, the image display apparatus 10 according to Embodiment 1 is less susceptible to the problem of a color shift or a color mixture depending on the viewing angle. As shown in FIGS. 3A and 3B, the image display apparatus 10 according to Embodiment 1 is capable of preventing interconnect reflections around the fourth auxiliary pixel W which emits white light. Therefore, the image display apparatus 10 according to Embodiment 1 is free from image quality degradations.

Specifically, when the viewer sees the image displayed by the color image display apparatus obliquely from above, a portion of light that has passed through the fourth auxiliary pixel W enters the first auxiliary pixel R or the second auxiliary pixel G because of the light shielding region 40, causing the fourth auxiliary pixel to look tinted. However, the image display apparatus 10 according to Embodiment 1 can effectively prevent such a phenomenon. Even when external light indicated by the arrows "a" is applied to the color image display apparatus and hits interconnects 24, the external light is reflected by the interconnects 24, but is shielded by the double-walled structures of the color filters and will not be emitted out of the color image display apparatus. In addition, even when external light indicated by the arrows "A" is applied to the color image display apparatus, the external light is prevented from further entering the color image display apparatus by the light shielding regions 40, and hence does not hit the interconnects 24, thereby causing no image quality degradations. Furthermore, since the light shielding region is provided on not all the auxiliary pixels, the aperture ratio (transmittance) is not greatly reduced. The light shielding regions 40 are effective to prevent a color shift or a color mixture due to a misalignment of the cells of the first substrate 21 and the second substrate 22.

The third auxiliary pixel B and the fourth auxiliary pixel W may not be required to have the light shielding region 40 for the following reasons: In the image display apparatus employing the existing black-matrix-less color filter, changes in the chromaticity coordinates of the color displayed by a fourth auxiliary pixel as observed from auxiliary pixels which are disposed adjacent to the fourth auxiliary pixel were measured. When the fourth auxiliary pixel was observed from a blue display auxiliary pixel (third auxiliary pixel) which displays blue color, the chromaticity coordinates of the color displayed by the fourth auxiliary pixel were generally in agreement with the black body locus, indicating a neutral color change. When the fourth auxiliary pixel was observed from a red display auxiliary pixel (first auxiliary pixel) which displays red color and a green display auxiliary pixel (second auxiliary pixel) which displays green color, the chromaticity coordinates of the color displayed by the fourth auxiliary pixel deviated greatly from the black body locus, indicating a deviation from the neutral color change. Therefore, it has been found that for effectively achieving a color shift reduction effect, it is preferable to provide the light shielding region 40 between the first auxiliary pixel R and the fourth auxiliary pixel W and/or between the third auxiliary pixel B and the fourth auxiliary pixel W.

Embodiment 2

Embodiment 2 is a modification of Embodiment 1. More specifically, Embodiment 2 is concerned with an image display apparatus according to the first mode of the present invention and an image display apparatus according to a second configuration of the present invention. In the image display apparatus according to Embodiment 2, the first auxiliary pixel R, the second auxiliary pixel G, the third auxiliary pixel B, and the fourth auxiliary pixel W jointly make up a pixel. The image display panel includes a two-dimensional matrix of pixels arranged in a first direction and a second direction.

Specifically, in examples shown in FIGS. 9A and 9B and FIGS. 10A and 10B, the first auxiliary pixel R, the second auxiliary pixel G, the third auxiliary pixel B, and the fourth auxiliary pixel W are disposed respectively in the first quadrant, the second quadrant, the third quadrant, and the fourth quadrant of a rectangular pixel. It is essentially arbitrary to determine which auxiliary pixel is to be disposed in which quadrant.

Figure 9A:
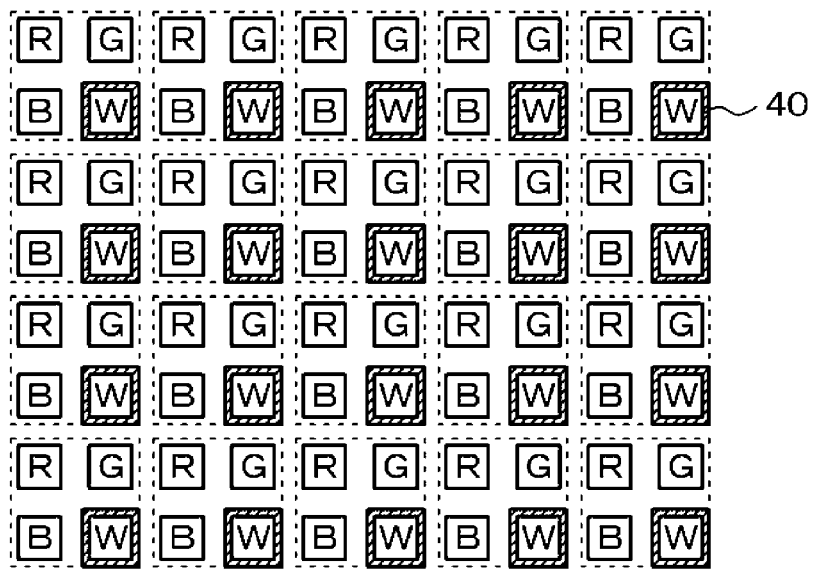
FIGS. 9A and 9B are schematic views of layouts of pixels in image display panels which serve as an image display apparatus according to Embodiment 2 and a modification (1) thereof.

In the example shown in FIG. 9A, the light shielding region 40 is disposed fully around the peripheral edge of each of the fourth auxiliary pixels W. Specifically, the light shielding region 40 extends continuously fully around the peripheral edge of each of the fourth auxiliary pixels W.

Figure 9B:
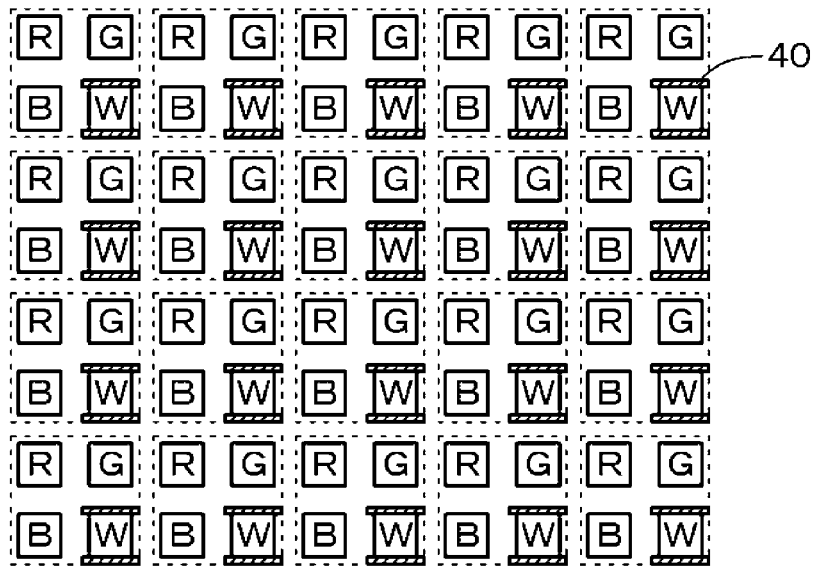
Figure 10A:
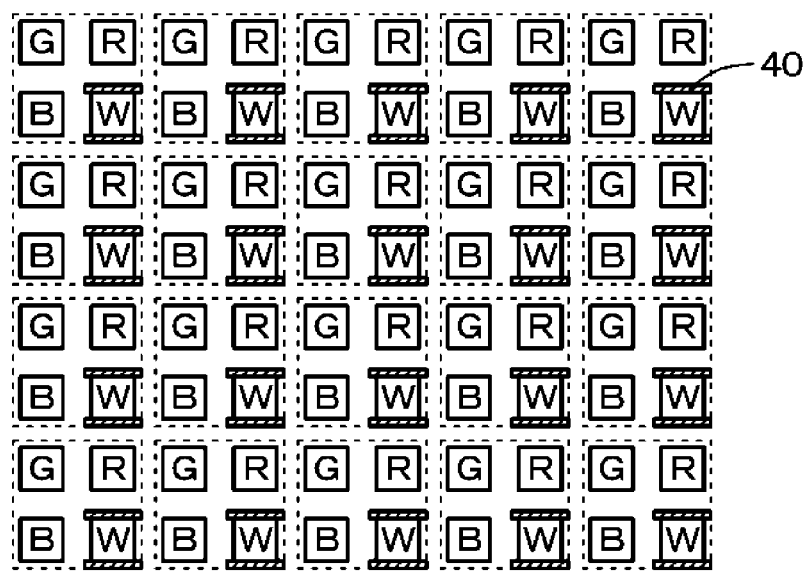
FIGS. 10A and 10B are schematic views of layouts of pixels in image display panels which serve as a modification (2) and a modification (3) of the image display apparatus according to Embodiment 2.
Figure 10B:
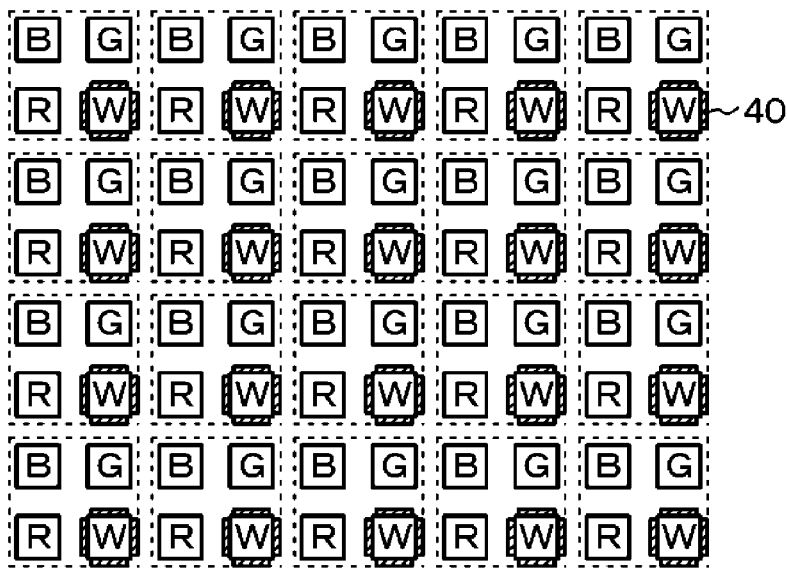

In the examples shown in FIG. 9B and FIGS. 10A and 10B, the light shielding region 40 is disposed partly around the peripheral edge of each of the fourth auxiliary pixels W. Specifically, in the example shown in FIG. 9B, the second auxiliary pixel G and the fourth auxiliary pixel W are disposed adjacent to each other, and the light shielding region 40 is disposed along a side of the peripheral edge of the fourth auxiliary pixel W which faces the adjacent second auxiliary pixel G. In the example shown in FIG. 10A, the first auxiliary pixel R and the fourth auxiliary pixel W are disposed adjacent to each other, and the light shielding region 40 is disposed along a side of the peripheral edge of the fourth auxiliary pixel W which faces the adjacent first auxiliary pixel R. In the example shown in FIG. 10B, the first auxiliary pixel R and the fourth auxiliary pixel W are disposed adjacent to each other, and the light shielding region 40 is disposed along a side of the peripheral edge of the fourth auxiliary pixel W which faces the adjacent first auxiliary pixel R, and the second auxiliary pixel G and the fourth auxiliary pixel W are disposed adjacent to each other, and the light shielding region 40 is disposed along a side of the peripheral edge of the fourth auxiliary pixel W which faces the adjacent second auxiliary pixel G.

Figure 11:
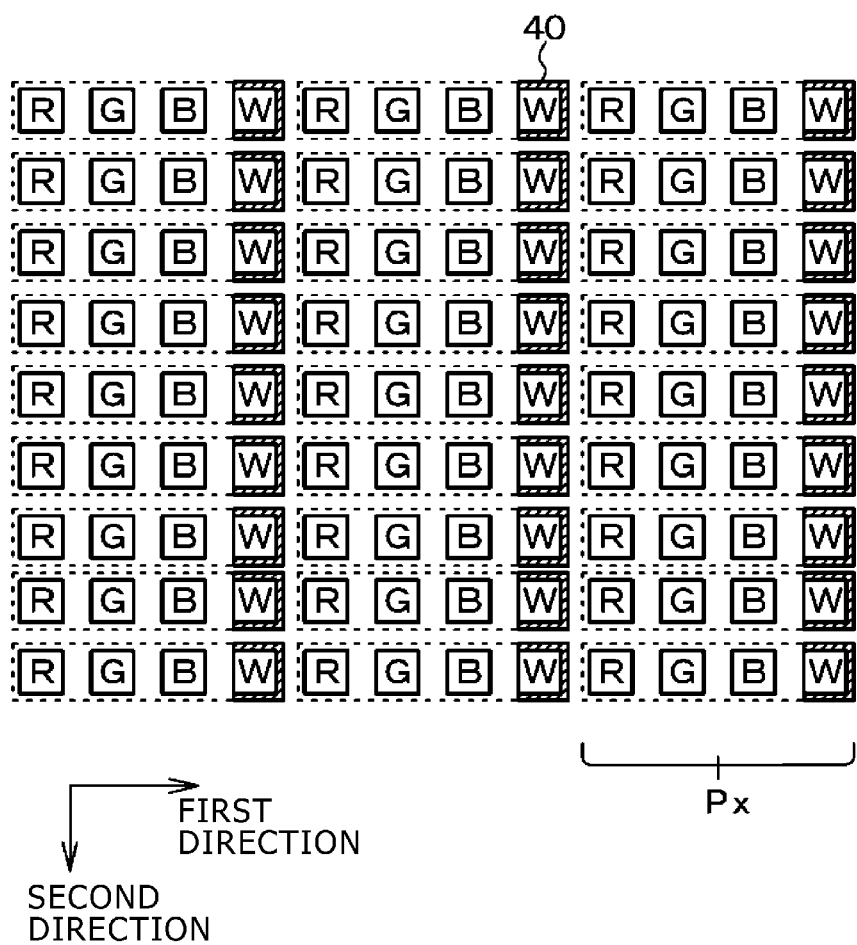
FIG. 11 is a schematic view of a layout of pixels in an image display panel which serves as a modification (4) of the image display apparatus according to Embodiment 2.

FIG. 11 schematically shows a layout of pixels in an image display panel which serves as a modification of Embodiment 2. In the example shown in FIG. 11, the first auxiliary pixel R, the second auxiliary pixel G, the third auxiliary pixel B, and the fourth auxiliary pixel W are arrayed along the first direction, jointly making up a pixel. The light shielding region 40 is disposed along a side of the peripheral edge of the fourth auxiliary pixel W which faces the adjacent fourth auxiliary pixel W. The light shielding region 40 is disposed along a side of the peripheral edge of the fourth auxiliary pixel W which faces the adjacent first auxiliary pixel R. In other words, the light shielding region 40 is disposed along three out of the four sides of the peripheral edge of the fourth auxiliary pixel W. The order in which the first auxiliary pixel R, the second auxiliary pixel G, the third auxiliary pixel B, and the fourth auxiliary pixel W are arrayed along the first direction is essentially arbitrary.

Except for those details described above, the image display apparatus according to Embodiment 2 are the same in configuration and structure as the image display apparatus according to Embodiment 1, and will not be described in detail below.

Embodiment 3

Figure 12:
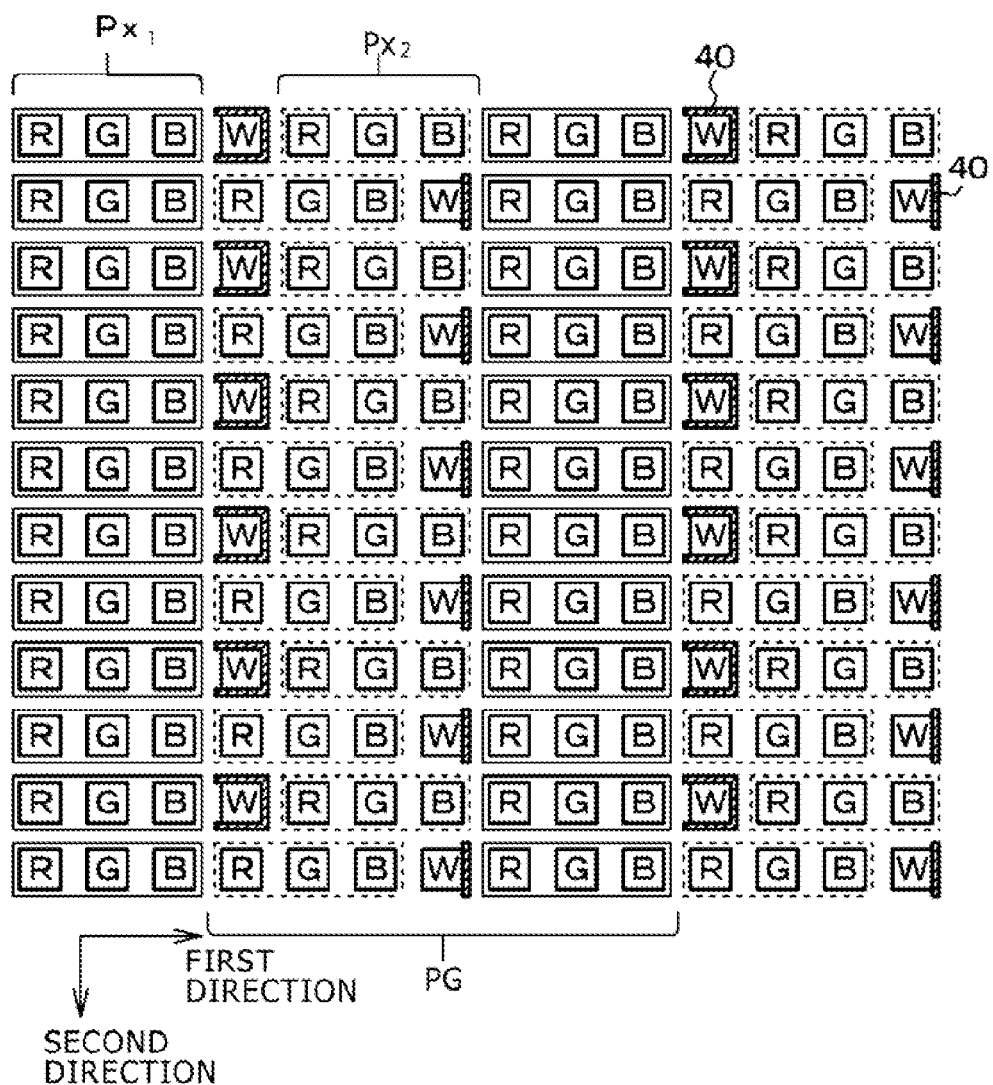
FIG. 12 is a schematic view of layout of pixels and a layout of a pixel group in an image display panel which serves as an image display apparatus according to Embodiment 3.
Figure 13:
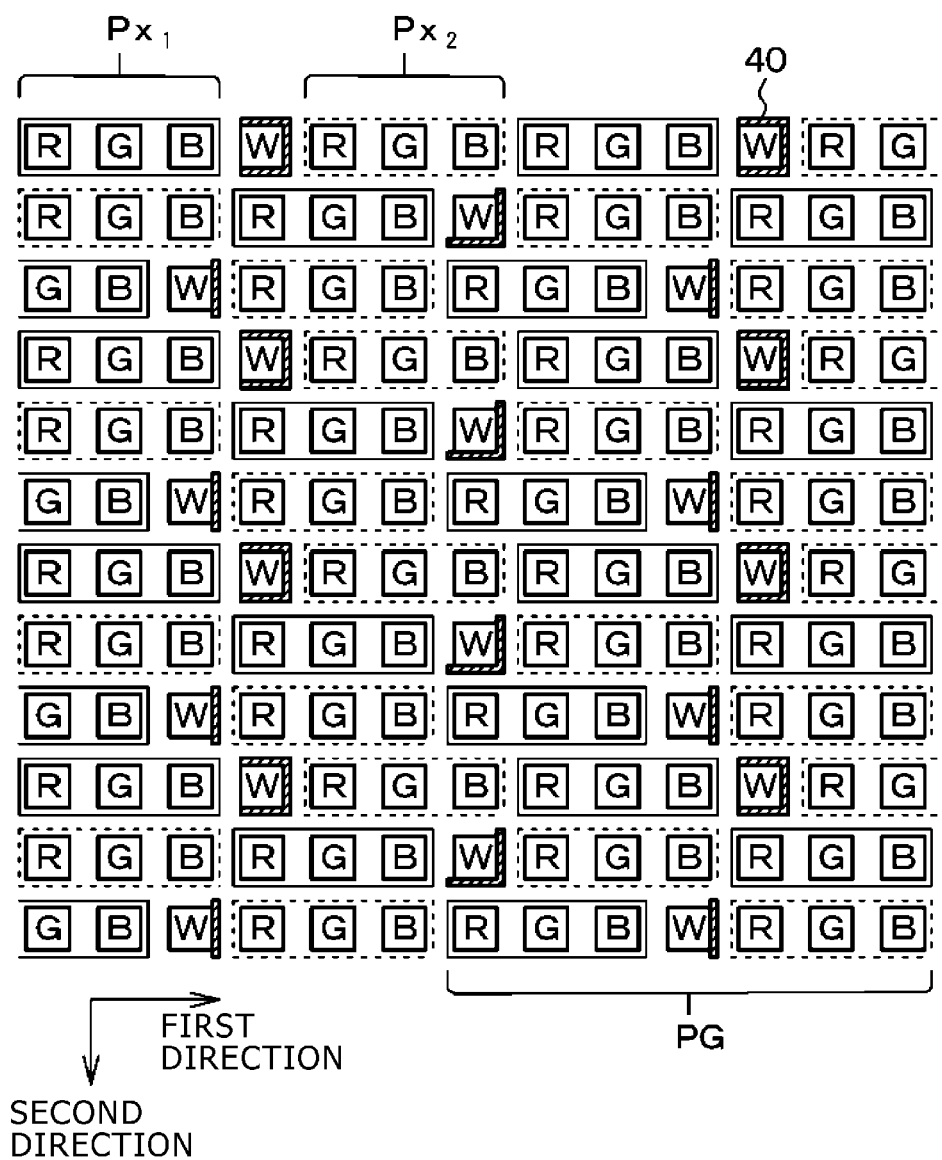
FIG. 13 is a schematic view of layout of pixels and a layout of a pixel group in an image display panel which serves as a modification (1) of the image display apparatus according to Embodiment 3.
Figure 14:
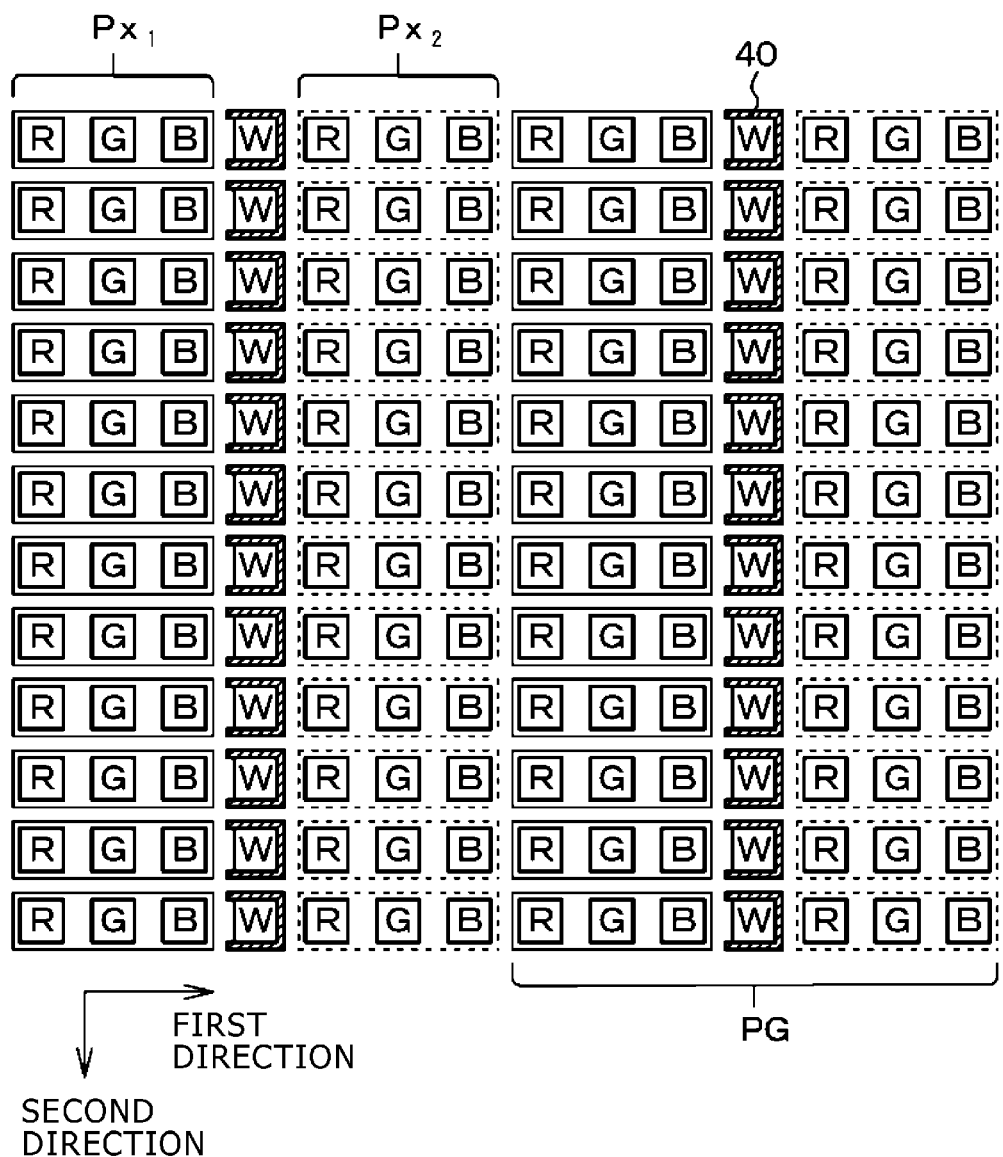
FIG. 14 is a schematic view of layout of pixels and a layout of a pixel group in an image display panel which serves as a modification (2) of the image display apparatus according to Embodiment 3.

Embodiment 3 is also a modification of Embodiment 1. More specifically, Embodiment 3 is concerned with an image display apparatus according to the first mode of the present invention and an image display apparatus according to a third configuration of the present invention. As shown in FIG. 12, 13, or 14, in the image display apparatus according to Embodiment 3, the first auxiliary pixel R, the second auxiliary pixel G, and the third auxiliary pixel B jointly make up a first pixel $Px_1$;

the first auxiliary pixel R, the second auxiliary pixel G, and the third auxiliary pixel B jointly make up a second pixel $Px_2$;

the first pixel $Px_1$, the second pixel $Px_2$, and the fourth auxiliary pixel W disposed between the first pixel $Px_1$ and the second pixel $Px_2$ jointly make up a pixel group; and the image display panel includes a two-dimensional matrix of pixel groups arranged in a first direction and a second direction.

According to Embodiment 3, specifically, a pixel group PG includes the first pixel $Px_1$ and the second pixel $Px_2$. If the number of pixels that make up the pixel group PG is represented by $p_0$, then $p_0=2$. However, $p_0$ is not limited to $p_0=2$, but may be $p_0 \geq 3$. In each pixel group PG, the fourth auxiliary pixel W for displaying a fourth color (specifically, white color in Embodiment 3) is disposed between the first pixel $Px_1$ and the second pixel $Px_2$.

In the example shown in FIG. 12, the first pixel $Px_1$ and the first pixel $Px_1$ are disposed adjacent to each other along the second direction, and the fourth auxiliary pixels W are not disposed adjacent to each other along the second direction. The second pixel $Px_2$ and the fourth auxiliary pixel W are disposed alternately with each other along the second direction. The alternate arrangement of the second pixel $Px_2$ and the fourth auxiliary pixel W reliably prevents a striped pattern from being recognized in displayed images due to the presence of the fourth auxiliary pixels W.

In the example shown in FIG. 13, the first pixel $Px_1$ and the second pixel $Px_2$ are disposed adjacent to each other along the second direction, and the fourth auxiliary pixels W are not disposed adjacent to each other along the second direction. The second pixel $Px_2$ and the fourth auxiliary pixel W are disposed alternately with each other along the second direction.

In the example shown in FIG. 14, the first pixel $Px_1$ and the first pixel $Px_1$ are disposed adjacent to each other along the second direction, the second pixel $Px_2$ and the second pixel $Px_2$ are disposed adjacent to each other along the second direction, and the fourth auxiliary pixel W and the fourth auxiliary pixel W are disposed adjacent to each other along the second direction.

Except for those details described above, the image display apparatus according to Embodiment 3 are the same in configuration and structure as the image display apparatus according to Embodiment 1, and will not be described in detail below.

Embodiment 4

Embodiment 4 is also a modification of Embodiment 1. More specifically, Embodiment 4 is concerned with an image display apparatus according to the second mode of the present invention. According to Embodiment 4, the fourth auxiliary pixel includes a fourth color filter for passing yellow light to display yellow color, and the light shielding region is disposed along sides of the peripheral edge of the fourth auxiliary pixel which face the adjacent first and second auxiliary pixels. The fourth auxiliary pixel thus arranged makes it possible to increase the color reproducibility and the transmittance. Except for those details described above, the image display apparatus according to Embodiment 4 are the same in configuration and structure as the image display apparatus according to Embodiments 1 through 3, and will not be described in detail below.

Embodiment 5

Embodiment 5 is also a modification of Embodiment 1. More specifically, Embodiment 5 is concerned with an image display apparatus according to the third mode of the present invention. According to Embodiment 5, the fourth auxiliary pixel includes a fourth color filter for passing cyan light to display cyan color, and the light shielding region is disposed along sides of the peripheral edge of the fourth auxiliary pixel which face the adjacent second and third auxiliary pixels. The fourth auxiliary pixel thus arranged makes it possible to increase the color reproducibility. Except for those details described above, the image display apparatus according to Embodiment 5 are the same in configuration and structure as the image display apparatus according to Embodiments 1 through 3, and will not be described in detail below.

The present invention has been described above based on the preferred embodiments. However, the present invention is not limited to those embodiments. The configurations and structures of the image display apparatus, the color liquid crystal display apparatus assembly, the color liquid crystal display apparatus, and the planar light source device described in the embodiments are illustrated by way of example only, and the components and materials thereof are also illustrated by way of example only, and may be changed appropriately. In the embodiments, the light shielding regions are disposed on the first substrate. However, the light shielding regions may be disposed on the second substrate in certain instances.

The present application contains subject matter related to that disclosed in Japanese Priority Patent Application JP 2010-072301 filed in the Japan Patent Office on Mar. 26, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising an image display panel, the image display panel including:
   first auxiliary pixels for displaying a first primary color, each of the first auxiliary pixels being provided with a first color filter for passing light of the first primary color;
   second auxiliary pixels for displaying a second primary color, each of the second auxiliary pixels being provided with a second color filter for passing light of the second primary color;
   third auxiliary pixels for displaying a third primary color, each of the third auxiliary pixels being provided with a third color filter for passing light of the third primary color;
   fourth auxiliary pixels for displaying a fourth color that is not the first primary color, not the second primary color, and not the third primary color; and
   light shielding disposed only on peripheral edges of the fourth auxiliary pixels and not overlapping central portions of the fourth auxiliary pixels,
   wherein,
      the light shielding being disposed along at least one of boundary regions between the first auxiliary pixels and fourth auxiliary pixels adjacent to the first auxiliary pixels, the second auxiliary pixels and fourth auxiliary pixels adjacent to the second auxiliary pixels, the third auxiliary pixels and fourth auxiliary pixels adjacent to the third auxiliary pixels, or adjacent fourth auxiliary pixels, and
      the light shielding is not disposed in boundary regions between the first auxiliary pixels and second auxiliary pixels adjacent to the first auxiliary pixels, the second auxiliary pixels and third auxiliary pixels adjacent to the second auxiliary pixels, or the third auxiliary pixels and first auxiliary pixels adjacent to the first auxiliary pixels.

2. The image display apparatus according to claim 1, wherein the first primary color is red, the second primary color is green, the third primary color is blue.

3. The image display apparatus according to claim 1, wherein:
   the first, second, third and fourth auxiliary pixels are disposed in a first direction, and the light shielding of the fourth auxiliary pixels is disposed along at least one of the boundary regions, which extend along a second direction crossing the first direction, of the auxiliary pixels.

4. The image display apparatus according to claim 1, wherein opposing two sides of peripheries of each of the fourth auxiliary pixels are surrounded by the light shielding.

5. The image display apparatus according to claim 1, wherein:
- the first auxiliary pixels, the second auxiliary pixels, the third auxiliary pixels, and the fourth auxiliary pixels are arranged in a first direction,
- the fourth auxiliary pixels are aligned in a second direction crossing the first direction, and
- at least one side of peripheries along the second direction of each of the fourth auxiliary pixels is provided with the light shielding.

6. An image display apparatus comprising an image display panel, the image display panel including:
- first auxiliary pixels for displaying a first primary color, each of the first auxiliary pixels being provided with a first color filter for passing light of the first primary color;
- second auxiliary pixels for displaying a second primary color, each of the second auxiliary pixels being provided with a second color filter for passing light of the second primary color;
- third auxiliary pixels for displaying a third primary color, each of the third auxiliary pixels being provided with a third color filter for passing light of the third primary color; and
- fourth auxiliary pixels for displaying a fourth color that is not the first primary color, not the second primary color, and not the third primary color, wherein,
- light shielding that does not overlap central portions of the fourth auxiliary pixels is disposed along peripheral edges of the fourth auxiliary pixels in at least one of boundary regions between the first auxiliary pixels and fourth auxiliary pixels adjacent to the first auxiliary pixels, the second auxiliary pixels and fourth auxiliary pixels adjacent to the second auxiliary pixels, the third auxiliary pixels and fourth auxiliary pixels adjacent to the third auxiliary pixels, or adjacent fourth auxiliary pixels,
- the first color filter and the second color filter between one of the first auxiliary pixels and one of the second auxiliary pixels are overlapped by the light shielding,
- the second color filter and the third color filter between one of the second auxiliary pixels and one of the third auxiliary pixels are overlapped by the light shielding, and
- the third color filter and the first color filter between one of the third auxiliary pixels and one of the first auxiliary pixels are overlapped by the light shielding.

7. The image display apparatus according to claim 6, wherein the light shielding is provided in a layer different from a layer of the first color filter, second color filter, and third color filter.

8. The image display apparatus according to claim 6, wherein the first primary color is red, the second primary color is green, the third primary color is blue.

* * * * *